United States Patent [19]
von Greyerz

[11] 4,016,779
[45] Apr. 12, 1977

[54] WORM DRIVE AUTOMATIC TRANSMISSION

[76] Inventor: John W. von Greyerz, 55 W. Rahn Road, Dayton, Ohio 45429

[22] Filed: Apr. 4, 1975

[21] Appl. No.: 564,877

[52] U.S. Cl. .............................................. 74/724
[51] Int. Cl.² ...................................... F16H 37/06
[58] Field of Search ............ 74/724, 730, 687, 731, 74/770, 720, 720.5

[56] References Cited

UNITED STATES PATENTS

| | | | |
|---|---|---|---|
| 2,171,146 | 8/1939 | Montelius | 74/687 |
| 2,246,018 | 6/1941 | Snyder | 74/730 |
| 2,638,796 | 5/1953 | Black | 74/730 X |
| 3,023,638 | 3/1962 | Westbury et al. | 74/687 |

OTHER PUBLICATIONS

"Torque Converter in Designs", *Product Engineering*, Feb. 1948 USA p. 97.

*Primary Examiner*—Samuel Scott
*Assistant Examiner*—Wesley S. Ratliff, Jr.

[57] ABSTRACT

This disclosure is directed to an improved transmission providing a substantially infinite motor to rear-wheel gear ratio capable of automatically adjusting itself under a wide variety of conditions. The transmission of this invention is comprised of three distinct operational units, the torque converter or fluid drive, the worm drive unit and the gear box unit. The transmission while in drive, is capable of providing a 100 to 1 motor to rear wheel ratio (substantially) and ratio can vary through any ratio necessary under particular driving conditions up to a 1-to-1 ratio.

5 Claims, 5 Drawing Figures

WORM DRIVE AUTOMATIC TRANSMISSION

The transmission of this invention utilizes a 5-member torque converter in accordance with a preferred embodiment to secure added power and operational flexibility.

The invention will be understood in more detail in reference to the accompanying drawings.

Figure 1A:
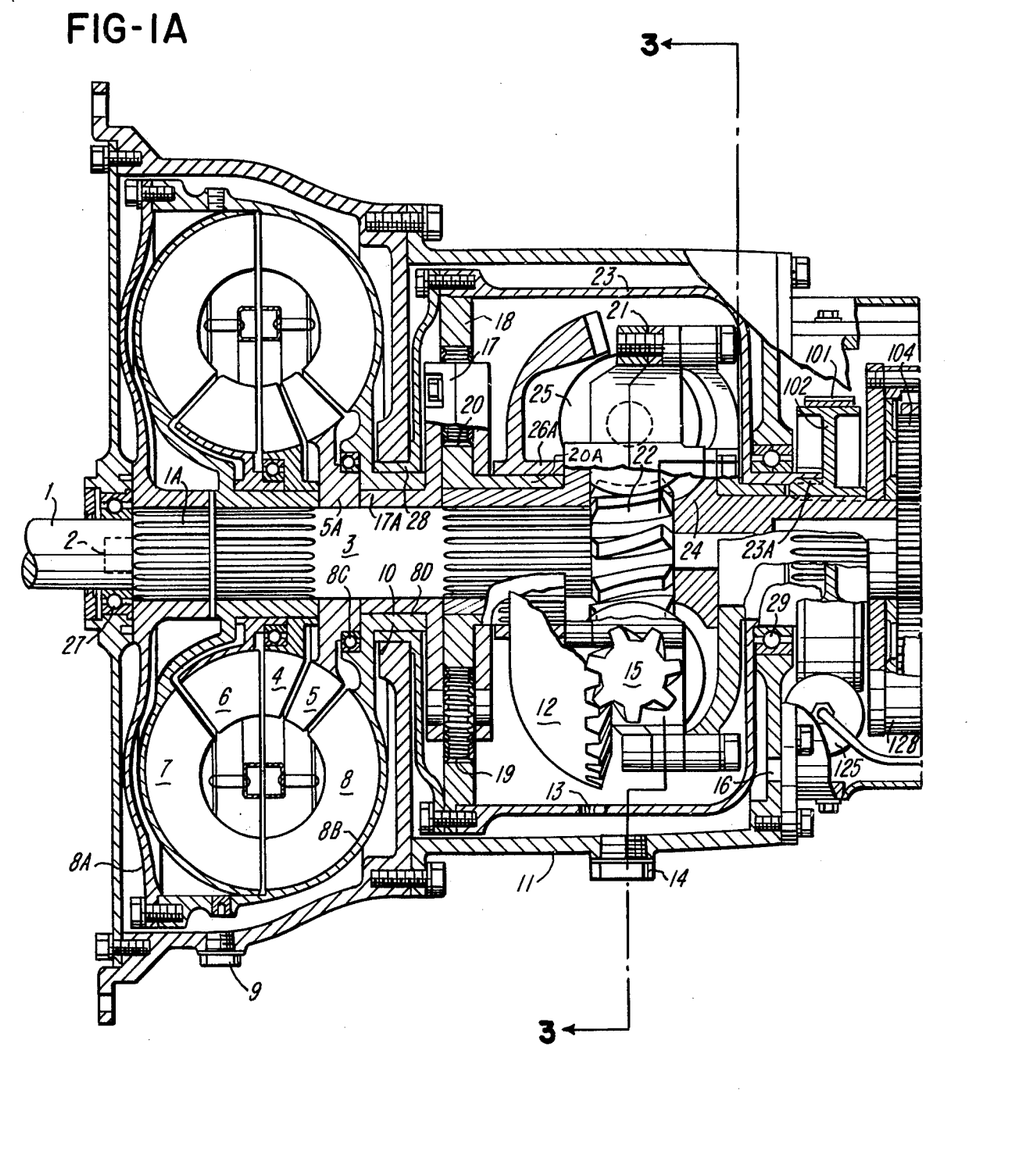
FIGS. 1A and 1B of the drawing collectively comprise a sectional view through the transmission of this invention. Dotted lines have been provided on both Type 1A and 1B to indicate the points of union.
Figure 1B:
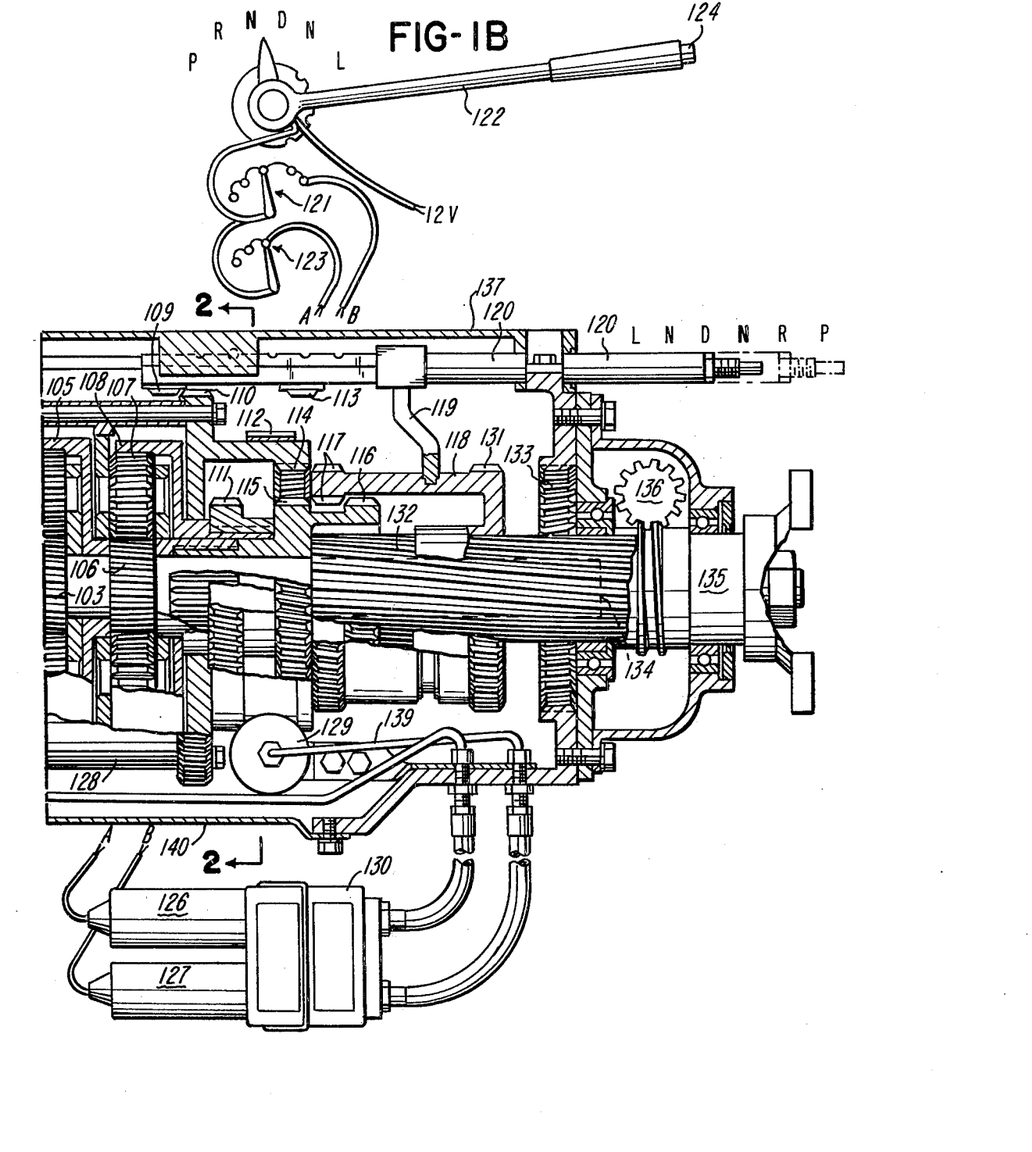
Figure 2:
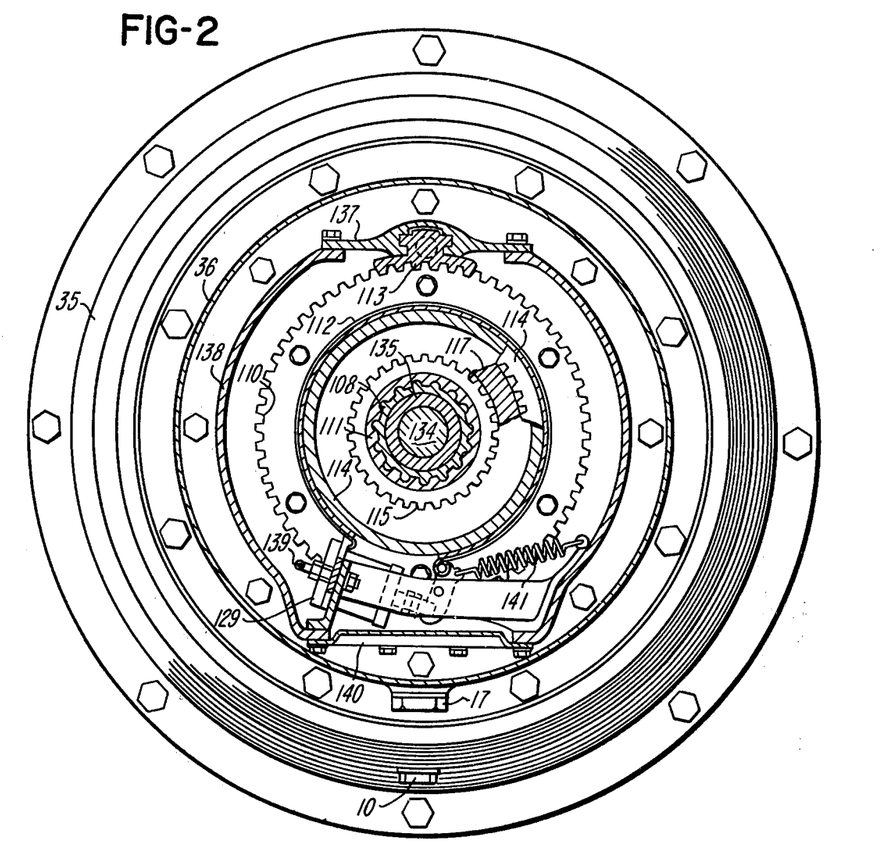
FIG. 2 is a sectional view of the gear box taken along the line 2—2 of FIG. 1B.

As will be noted from FIG. 1, input shaft 1, having splines shown at 1A, is driven by the power source and stabilized by the forward stabilizer shaft 2. Shaft 1 is coupled to primary pump forward housing 8A through the splines 1A. Primary pump 8 is attached to housing 8B which then surrounds the inner shaft of the transmission being supported by bearing 28.

The rotary motion of primary pump 8 causes the secondary pump 5 to rotate with it, either by the torque converted action or due to the over-running clutch bearing 8C. Primary pump 8 drives the planetary housing 17 via shaft 17A which in turn is splined to spline shaft 8D.

Planetary housing 17 always revolves with input shaft 1.

In an alternative embodiment, splined shaft 17A can be splined to secondary pump 5 and secondary pump alternative spline 5A instead of to the splined shaft 8D of the primary pump 8. This alternative arrangement is utilized when added planetary carrier speed is required under the particular load conditions to which the transmission vehicle will be subjected. Under these arrangement conditions, the rotation of planetary carrier 17 causes gear action within the planetary gears. Planet pinion gear 19 revolves between the planetary ring gear 18 and the sun gear 20, the planetary ring gear 18 is attached to the output shaft return housing 23 which in turn is splined to the output shaft at splined portion 23A.

The planetary ring gear 18 revolves at substantially the same speed as the output shaft and the drive axle in cases where a 1-to-1 ratio differential is employed. Under load conditions, planet/pinion gear 19 is caused to orbit in the same direction as the motor, yet revolve in the opposite direction as the motor thereby causing sun gear 20 to revolve in the same direction as the motor only at a higher rate of speed. By utilization of the output shaft return housing 23 to obtain added gear rotation in the planet carrier commensurate with speed and load conditions, lower motor to output shaft gear ratios are obtainable upon increasing fuel input resulting in greater and more responsive acceleration. This will be elaborated upon herein below.

Sun gear 20 is directly connected to splined shaft 20A thereby linking it to worm drive ring gear 12. Thus under load and during acceleration, the worm drive ring gear 12 revolves more rapidly than the engine. Ring gear 12 is meshed with at least two planetary pinion hypoid worm drive gears 15. The power required to drive the planet carrier 17 and ring gear 12 is directly applied to the output shaft through the planetary ring gear 18 and the output shaft return housing 23.

The hypoid worm drive gears 15 are attached to (or optionally made a part of or integral with) planet pinion worm gears 25. These planet pinion worm gears are mounted in bearings 30 and are supported by the planetary worm carrier 21. Rotation of the hypoid worm drive gears 15 then causes rotation of the pinion worm gears 25. While the vehicle embodying the transmission of this invention is motionless with the motor running and either in gear or under heavy load or acceleration, the planet pinion worm gears 25 rotate at a rapid rate of speed. Rotation of the worm gears 25 permits fairly rapid rotation of the supporting planet worm carrier 21 without necessarily rotating the sun worm gear 22. It will be observed that worm gears 25 do not drive either sun worm gear 22 or the planetary worm carrier 21. Worm gears 25 act as a governor or sliding clutch between carrier 21 and sun worm gear 22. This key function of worm gears 25 serving as a governor or sliding clutch provides a functional and structural arrangements differing from other worm gear arrangements utilized in the prior art.

Rotation of input shaft 1 and primary pump 8 cause the turbine 7 to revolve. During acceleration or when the transmission is under load, the turbine revolution of speed is somewhat less than that of primary pump 8. As shown in FIG. 1, turbine 7 is splined to turbine shaft 3 which in turn is splined to planetary worm carrier 21. Rotation of turbine 7 at any given speed causes rotation of planetary worm carrier 21 at the same speed as that of turbine 7. The differences in speed of rotation between planet worm carrier 21 and center worm gear 22 with its associated output shaft 24 depends upon the rotational speed of the planet pinion worm gears 25. This is another unique structural and positional arrangement which affords a function in the transmission of this invention which is not believed to be capable of performance in prior art transmissions. Thus, under load and during acceleration, the turbine in the torque converter is permitted to run intentionally at a fairly high percentage of the comparative speed of the primary pump to reduce oil velocity and turbulence thereby producing a high rate of torque without overheating the torque converter which in turn would apply the torque directly to the planetary worm carrier 21. Planetary worm carrier 21 is permitted to revolve fairly rapidly due to the rapid action of planet pinion worm gears 25. That torque thus generated is then applied to sun worm gear 22 and its associated output shaft 24.

Turbine 7 applies constant torque to the planetary worm carrier 21 which in turn applies maximum torque to sun worm gear 22 through the sliding clutch governor type action of planet pinion worm gears 25, while under load, on through to a light load 1 to 1 ratio condition.

Through revolving of the planet pinion worm gears 25, at a given rate of speed, the turbine to output shaft ratio can vary over an extremely low range or as an example a range approximating from 100-to-1 to 1-to-1 depending upon load conditions without shifting gears or without placing undue strain or conditions generating overheating of the torque converter. This is an advantage of this invention which is not possessed by conventional transmissions such as utilized in the prior art.

The allowable differences in speed between primary pump 8 and turbine 7 can be governed by the variation of the size of the planet carrier 17, gear configuration of planet pinion gear 19 and sun gear 20 in relation to the size of the worm drive ring gear 12, planet pinion hypoid worm drive gears 15, planet pinion worm gears 25, and sun worm gear 22. Of these, the most effective way is to vary the size of the planet pinion hypoid worm drive gears 15. The simplified drawing below and associated table clarifies the primary pump - turbine lag and gear action under load with the shaft 24 at a standstill.

Table 1

OUTPUT SHAFT (24) AT ORPM-PLANCARR (17) SUN GEAR (20) RATIO 1 TO
2.6RPM WORM SINGLETHREAD WORM DRIVE RING GEAR (12) WITH 38 TEETH-
PINION GEAR (15) WITH 7 TEETH

APPROX. RPM 9% PRIMARY PUMP - TURBINE LAG

| 1 ENGINE & INPUT SHAFT | 7&21 TURBINE & PLANET CAR. | 8 PRIMARY PUMP | 17 PLANET CARRIER | 20&1 SUN GEAR WORM GEAR | 15 PLANET PINION | 18&22&24 OUTPUT SHAFT ETC. |
|---|---|---|---|---|---|---|
| 1 | .91 | 1 | 1 | 2.6 | 9.174 | 0 |
| 10 | 9.1 | 10 | 10 | 2.6 | 91.74 | 0 |
| 100 | 91 | 100 | 100 | 260 | 917 | 0 |
| 1000 | 910 | 1000 | 1000 | 2600 | 9174 | 0 |

WORM DRIVE RING GEAR (12) WITH 38 TEETH - PINION GEAR (15)
WITH 10 TEETH
APPROX RPM 28% PRIMARY PUMP - TURBINE LAG

| 1 | .72 | 1 | 1 | 2.6 | 7.159 | 0 |
| 10 | 7.2 | 10 | 10 | 26 | 71.59 | 0 |
| 100 | 72 | 100 | 100 | 260 | 715 | 0 |
| 1000 | 720 | 1000 | 1000 | 2600 | 7159 | 0 |

To further clarify the above table I, the following gear action takes place in the 9% example. With the output shaft 24 at a standstill and the input shaft 1 revolving one revolution, it also revolves the primary pump and planet carrier 17 one revolution. With the planetary ring gear 18 also stationary with the output shaft, the planetary pinion gears 19 are made to revolve in the opposite direction, but orbiting in the same direction thereby causing sun gear 20 and worm drive ring gear 12 to revolve 2.6 times. Worm drive ring gear 12 may have any relative number of teeth. In this example it has 38 teeth. Planetary pinion hypoid worm drive gear 15 may also vary in the number of teeth depending on the ratio desired. In the above example it has 7 teeth. While ring gear 12 revolves 2.6 times, pinion gears 15 revolve rapidly causing planetary worm carrier 21 to revolve 0.91 of a revolution. Deducting the 0.91 of a revolution from the 2.6 revolutions ring gear 12 made, because its rotating in the same direction, leaves a net gain of 1.69 revolutions — multiplied by the 38 teeth of ring gear 12 totals approximately 64 teeth. Planetary pinion gear having 7 teeth divided into the 64 makes it revolve approximately 9 times. Sun worm gear 22 for this example has 10 teeth and planet pinion worm gear 25 must revolve 10 times to make a complete revolution. For this example it revolved approximately 9.1 times or approximately 91% of the revolution which means the planetary worm carrier 21 and turbine 7 lagged the primary pump by 9% and revolved with it while the primary pump revolved 1 full revolution. From the above it can be seen that the turbine can be designed to rotate at a given percentage of the primary pump under full load, based on the relative gear ratios involved.

Figure 3:
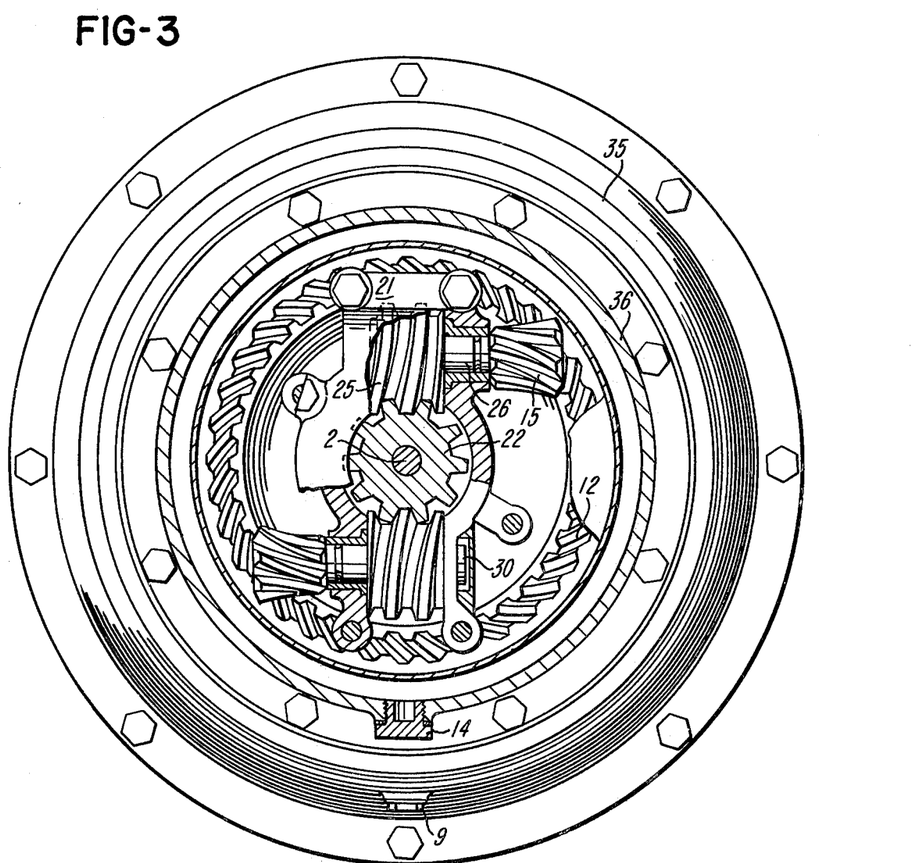
FIG. 3 is a cross-sectional view of the planetary worm gear arrangement taken along the line 3—3 of FIG. 1A.
Figure 4:
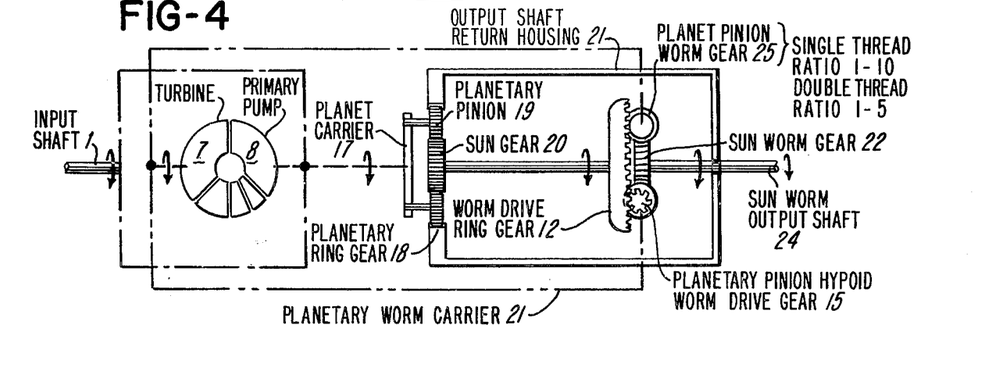
FIG. 4 is a diagrammatic view illustrating the direction of movement of the main members of the transmission.

Instead of using single thread worm gears, double threaded worm gears can be utilized provided that the worm drive gear 12 and planet pinion worm drive gears 15 are proportionally sized to reduce the speed of planet pinion worm gears 25 proportionally. Worm gears 25 are threaded, e.g., as shown in FIGS. 1 and 3, in an accurate configuration so as to cause revolution of the planetary worm carrier 21 in the same direction as the revolution of the motor, turbine and output shaft.

When the transmission is under load, the planet pinion worm gears 25 are precluded from revolving at a speed which would permit planet worm carrier 21 and turbine 7 to revolve at the same speed or faster than primary pump 8. This is accomplished in accordance with this invention by sizing planetary pinion hypoid worm drive gears 15 and worm drive ring gear 12 with the proper ratio in respect to each other. Using the previous as an example. If the worm drive ring gear 12 had 42 teeth instead of 38, this would make planetary pinion hypoid worm drive gear 15 revolve more than 10 times causing the planetary worm carrier 21 and turbine 7 to revolve a full turn along with primary pump 8. Under this condition the transmission would not have the ability to propel itself out of low gear nor would it apply any torque to the sun worm gear 22. Refering to the table shown above it can be seen that for a transmission having a 9% lag at full load between the main torque converter units there is a difference of 90 RPM. In the example of the one having a 28% lag there is a difference of 280 RPM. The torque generated as a result of these differences in speed is applied to the sun worm gear 22 through planet pinion worm gear 25 and planetary worm carrier 21. As for example, if the planetary worm carrier 21 is revolving 5 times as fast as the sun worm gear 22 and associated output shaft 24 and if there was a difference of 100 RPM in the torque converter, regardless of its speed, the torque thus generated would be applied to the sun worm gear 22 giving it better than a 5 to 1 motor to output shaft ratio at that point in time.

The allowable lag, when the transmission is at or substantially at full load, between the main torque converter units is specifically provided within the range of approximately 5 per cent to approximately 50 per cent depending on the size and weight of the vehicle and the power or performance criteria which the vehicle is required to attain.

As mentioned previously, changing gear ratios in the gear train will effectively change the allowable lag between units in the torque converter. Changing the size of gears without changing the gear configuration in the planet carrier 17 will have little affect on the 1 to 2.6 primary pump 8 to planet carrier 17 ratio. The most effective means for obtaining different amounts of lag under load is to change the ratio between the worm drive ring gear 12 and the planetary pinion gear 15. Table 2 shows the effect of varying the size of the planetary pinion gears 15 and using a worm drive ring gear 12 having 38 teeth.

Table 2

| WORM DRIVE RING GEAR 12 | PLANET PINION GEAR 15 | PRIMARY PUMP 8 TURBINE 7 APPROX. % LAG |
| --- | --- | --- |
| 38 TEETH | 7 TEETH | 9 % |
| 38 TEETH | 8 TEETH | 16 % |
| 38 TEETH | 9 TEETH | 23 % |
| 38 TEETH | 10 TEETH | 28 % |
| 38 TEETH | 11 TEETH | 33 % |
| 38 TEETH | 12 TEETH | 37 % |

It must be remembered that the higher percentage of lag, the greater the turbulence in the torque converter.

When sufficient torque is applied to sun worm gear 22 and associated output shaft 24, the vehicle begins to move and picks up speed as it travels along. As this happens, output shaft return housing 23 revolves at the same speed as the output shaft since it is splined to neutral brake shoe 102, which in turn is splined to output shaft 24. Planetary ring gear 18 is bolted (or secured in equivalent manner) to output shaft return housing 23 and as it picks up rotational speed, planet pinion gears 19 reduce their spped thereby reducing the speed of worm drive ring gear 12 and planet pinion worm gears 25. This results in gradual reduction in the gear action permitting turbine 7 to attain the same speed as primary pump 8.

Under light load conditions, the torque converter and entire worm drive unit revolves as a single unit, viz., at the same speed. All gear action and pump action ceases under this operational condition until a change in grade under which the vehicle is traveling demands a lower gear ratio. The transmission automatically adjusts itself to the demand. In circumstances where a rapid acceleration or burst of speed is required, such as for passing another vehicle, accelaration of the motor causes primary pump 8 and planet carrier 17 to increase speed thereby causing moare rapid rotation of sun gear 20. This rapid rotation in turn causes corresponding rapid rotation of worm drive ring gear 12, planet pinion worm drive gears 15 and planet pinion worm gears 25. The increased planet pinion worm gear rotation permits the planetary worm carrier 21 to revolve more rapidly than the output shaft yet more slowly than the primary pump. The added speed and torque from the turbine shaft 7 is then directly applied to the output shaft through the planetary worm carrier 21 and associated worm gears 25 and 22. Worm gears 25 revolve on their axles as a result of the pinion gears 15 driving them.

Under such operational conditions, there is a reverse propulsion of sun worm gear 22 sufficiently to allow planet worm carrier 21 to revolve at a slightly reduced speed as compared to the motor, yet at the same time effectively drag the sun worm gear 22 forward with it at a much slower speed, viz., than the speed of the turbine 7, primpary pump 8, or planetary worm carrier 21 and in the same direction as the motor thereby causing application of a considerable amount of torque to the output shaft.

Forward bearing 27, middle bearing 28 and rear bearing 29 support the entire forward part of the transmission. Central stabilizing shaft 2 is free moving and provides added stability to the transmission moving parts.

As stated previously, double threaded worm gears may be used in the planet pinion worm gears 25 and associated sun worm gear 22 in lieu of single threaded gears. Use of double threaded worm gears will permit planet pinion worm gear 25 to cut the number of revolutions in half, since for every revolution it will travel the width of 2 threads instead of one, or twice the distance. To cut the speed in half, planetary pinion hypoid worm drive gears 15 can be doubled in size or changed in size along with worm drive ring gear 12 to produce the desired results. Due to the more accentuated arcuate configuration, the double threaded worm gears would require less torque to revolve than single threaded gears. The tables shown below illustrate the affects on planetary pinion gears 15 when in operation and compares the use of single threaded gears with double thread. It can be seen that double threaded worm gears do not revolve as fast and would be more suitable for most applications.

TABLE 3

5 TO 1 MOTOR TO OUTPUT SHAFT RATIO
APPROX. RPM 16% MAX. PRIMARY PUMP - TURBINE LAG

| 1 ENGINE INPUT SHAFT RPM | 7 & 21 TURB. & PLANET CAR. RPM | 8 & 17 PRIM. PUMP PLANET CAR. RPM | 20 & 12 SUN GEAR WORN GEAR RPM | 15 PLAN. PIN SGL THRD RPM | 15 PLAN. PIN DBL THRD RPM | 18&22&24 PLAN. R.G. SWG-OPS RPM |
| --- | --- | --- | --- | --- | --- | --- |
| 10 | 8.4 | 10 | 22 | 64 | 32 | 2 |
| 100 | 84 | 100 | 219 | 640 | 320 | 20 |
| 500 | 420 | 500 | 1094 | 3200 | 1600 | 100 |
| 1000 | 840 | 1000 | 2187 | 6400 | 3200 | 200 |
| 2000 | 1680 | 2000 | 4374 | 12800 | 6400 | 400 |

The above illustrates the relative gear speed ratios in a constant 5 to 1 motor to output shaft ratio. The below illustrates the effect on gears at a constant 1000 RPM starting from a 100–1 motor to output shaft ratio and varied to a 1—1 ratio.

TABLE 4

RELATIVE GEAR SPEEDS WITH ENGINE SPEED 1000 RPM
APPROX. RPM VARIABLE PRIMARY PUMP - TURBINE LAG

| MOTOR TO OUTPUT SHAFT RATIO | 7 & 21 TURB. & PLANET CAR. RPM | 8 & 17 PRIM. PUMP PLAN. CAR. RPM | 20 & 12 SUN GEAR WORN GEAR RPM | 15 PLAN. PIN SGL THRD RPM | 15 PLAN. PIN DBL THRD RPM | 1 ENG & INP SHF RPM | 18&22 &24 PLAN RG SWG-OPS RPM |
|---|---|---|---|---|---|---|---|
| 100-1 | 10% 900 | 1000 | 2774 | 8900 | 4450 | 1000 | 10 |
| 50-1 | 10% 900 | 1000 | 2753 | 8800 | 4400 | 1000 | 20 |
| 10-1 | 10% 900 | 1000 | 2584 | 8000 | 4000 | 1000 | 100 |
| 5-1 | 5% 950 | 1000 | 2529 | 7500 | 3750 | 1000 | 200 |
| 3-1 | 3% 970 | 1000 | 2311 | 6370 | 3185 | 1000 | 333 |
| 2-1 | 2% 980 | 1000 | 1990 | 4800 | 2400 | 1000 | 500 |
| 1.5-1 | 1% 990 | 1000 | 1495 | 2400 | 1200 | 1000 | 750 |
| 1-1* | 0% 1000 | 1000 | 1000 | 0 | 0 | 1000 | 1000 |

*Primary Pump-Turbine Lag

The values in Table 5 below show the approximate gear speeds, input and output speeds as well as miles per hour in a simulated condition closely related to what could be an actual condition for a vehicle having tires 18 inches in diameter and a 1 to 1 ratio rear end.

TABLE 5

RELATIVE GEAR SPEEDS WITH CHANGING RATIOS

| MOTOR TO OUTPUT SHAFT RATIO | 7 & 21 TURB. & PLANET CAR. RPM | 8 & 17 PRIM. PUMP PLAN. CAR. RPM | 20 & 12 SUN GEAR WORN GERAR RPM | 15 PLAN. PIN SGL THRD RPM | 15 PLAN. PIN DBL THRD RPM | 1 ENG & INP SHF RPM | 18&32 &24 OUTPUT SHAFT RPM |
|---|---|---|---|---|---|---|---|
| 10-1 | 16% 420 | 500 | 1199 | 3700 | 1850 | 500 | 50 4 |
| 8-1 | 14% 516 | 600 | 1444 | 4410 | 2205 | 600 | 75 6 |
| 6-1 | 12% 616 | 700 | 1666 | 4990 | 2495 | 700 | 117 10 |
| 4-1 | 10% 720 | 800 | 1815 | 5200 | 2600 | 800 | 200 17 |
| 2-1 | 8% 828 | 900 | 1624 | 3780 | 1890 | 900 | 450 37 |
| 1.1-1 | 7% 884 | 950 | 1412 | 2510 | 1255 | 950 | 633 53 |
| 1.1-1 | 3% 970 | 1000 | 1098 | 610 | 305 | 1000 | 909 75 |
| 1-1 | *0% 1000 | 1000 | 1000 | 0 | 0 | 1000 | 1000 83* |

*PRIMARY PUMP-TURBINE LAG
*APPROX. MILES PER HR.

Tables 4 and 5 show various motor to output shaft ratios. When for instance a differential is used having a 2 to 1 ratio, the motor to drive wheel ratio is double that shown above.

The gear box associated with the worm drive unit provides the necessary park, reverse, neutral, drive and low gear(s). The low gears are customarily utilized for driving downhill. Conventionally there are two sets of bands involved to stop gear action when engaging and disengaging gears. The brake bands are operated by conventional brake cylinders, brake fluid and twin master cylinders which in turn are actuated by solenoids. The use of such system eliminates the need for fulltime oil pumps, which themselves require added power for operation.

The transition from one gear to another is accomplished by either manual or automatic gear shifting mechanism. A manual shifting mechanism can be by gear shift lever 122 (FIG. 1) or by other means such as push buttons, etc. The shifting mechanism is linked to the shifter rod 120 which in turn slides shifter fork 119 and associated synchromeshed coupler 118 to the desired position to engage or disengage the coupling ring gear, 117. The gear box incorporates a double planetary gear system serving as a low gear unit as well as reverse. FIG. 1 of the drawing shows the unit in neutral position. Sun worm output shaft 24 has a low reverse sun gear 103 directly attached thereto. When the transmission is in neutral position, the entire low-reverse planet carrier 128 has a tendency to rotate while the motor is running. Both brake bands are disengaged during this time until switch 124 is depressed. While running in neutral, ring gears 114, 115 and 116 are revolving. Ring gears 117, synchromeshed-splined output shaft 132 and output shaft 135 are at standstill.

In order to place the transmission in a drive position, the gear shift lock switchbutton 124 is depressed. In this position, both solenoids 126 and 127 are caused to operate, thereby braking the planet carrier 128 to a stop. With both solenoids in operation all gears in the planetary worm gear unit also stop. With planet carrier 128 at a standstill along with ring gears 114 and 115, ring gear 117 is then advanced into the drive position wherein it meshed with outer coupling ring gear 114 and inner coupling ring gear 115. This meshing action locks the entire planet carrier 128 into a solid unit causing a direct drive from the sun worm output shaft 24 to the output shaft 135.

With the vehicle transmission in a drive position, when it is desired to shift into low gear, gear shift switch 124 is depressed and the gear shift lever pushed through the neutral area where contact is made via switch 121 which activates solenoid 127 and brake band 112. This action slows down and stops planet carrier 128 permitting the gear shift to be advanced into the low position. When the gear shift is fully advanced, the low holding gear 113 meshes with ring gear 110, viz., the low-reverse holding ring gear. This in turn takes over the action of brake band 112 positively holding it in place. With the planet carrier held in place, sun gear 103 causes pinion gear 104 and ring gear 105 to rotate in the opposite direction. Ring gear 105 in turn rotates sun gear 106 in the opposite direction as that in which the driveshaft motor and transmission is rotating. Pinion gear 107 and ring gear 108 then turn the same direction as that in which the motor is turning. Ring gear 108 is coupled to ring gear 111 which in turn is meshed with ring gear 117, in the specific gear and transmission arrangement shown in FIG. 1, this provides approximately an 8-to-1 overall gear reduction. It will be noted that the synchromeshed coupler 118 is meshed with spline output shaft 132 at all gear selection positions.

When shifting from low gear into drive position, it is necessary to depress the gear shift switch 124 and advance it into the neutral position and release the switch. This causes planet carrier 128 to accelerate its speed which allows the gear shift to be advanced into drive accompanied by meshing of outer coupling ring gear 114, inner coupling ring gear 115 and coupler ring gears 117.

When it is desired to place the transmission into reverse, gear shift switch 124 is again depressed which activates both solenoids and the brake bands and permits reverse coupling ring gear 116 and coupling ring gear 117 to be meshed. Reverse holding gear 109 meshes with ring gear 110 which holds planet carrier 128 in place. Sun gear 106 runs in reverse under these conditions and is coupled to ring gear 116 thereby turning the synchromeshed-splined output shaft 132 and output shaft 135 in reverse. Pinion gear 107 and ring gear 108 are permitted to run free while in reverse.

Placing the transmission in the parking position is attained by depressing gear shift switch 124 in the neutral position, thereby stopping planet carrier 128. When the gear shift lever is advanced through the reverse position into park, ring gear 131 is meshed with ring gear 133, which in turn is attached (or made integral with or a part of) the housing, thereby locking the output shaft to the casing. When the gear shift switch is subsequently released, planet carrier 128 is permitted to run free thereby permitting selection of either a forward or reverse gearing position.

In retrospect it will be recalled that turbine 7 powers planetary worm carrier 21 which in turn powers the output shaft 24. In accordance with this invention, the gear action occurring within planetary worm carrier 21, as it encounters varying load conditions and responds thereto, permits planetary worm carrier 21 and associated planet pinion worm gears 25 to function as a governor. As the output shaft speed increases, the load decreases and the turbine equalizes its speed with that of the primary pump, thereby reducing the gear action. As the desired speed is attained under a "no-load condition", there is substantially no gear action, and the entire internal transmission rotates as a solid unit. Due to the ability of the transmission of this invention to respond to slight changes in load conditions coupled with its ability to obtain very low gear ratios, as the occasion requires, without creating undue strain or overheating of the torque converter, the present invention provides an effective transmission capable of substantially reducing or eliminating differential gear reductions such as those presently encoutered in motor vehicles. One practical result of this is a lessening in fuel consumption in the vehicles incorporating the transmission of this invention.

It should be understood that in the planetary gear system 17 (FIG. 1A), fiber gears such as nylon, polypropylene, polytetrafluoroethylene ("Teflon"), glass fiber-reinforced thermosetting or thermoplastic resinous materials, equivalent materials may be employed to constitute the gears utilized in the planetary gear arrangement, such as shown in FIG. 1. The use of fiber gears, esp., nylon, enhances the quietness of the transmission.

The transmission set forth hereinabove is capable of handling requirements for maximum power output under a wide variety of operating circumstances and operational loads. The transmission is rugged enough for utilization in not only passenger transportation vehicles, automobiles, but also in cargo hauling vehicles such as trucks or earth-moving equipment and rail equipment as well.

In conclusion, the transmission herein described incorporates the use of a five member torque converter in combination with a planetary worm gear system to provide constant torque on the output shaft from an extrememly low gear ratio to a 1 to 1 ratio without the use of bands, oil pumps or shifting gears. It is instantly and automatically sensitive to all changes in grade requiring lower gear ratios and continually seeks to return to a 1 to 1 ratio. Due to its infinite range of gear ratios it has the capability of propelling vehicles with a 1—1 to 2—1 ratio differential and with improved performance. This compares to present vehicles having automatic transmissions with ratios of approximately 2-1 to 1—1 in band operated gear shifting steps and differential with 3.3-1 to 5-1 ratios. The average vehicle is equipped with a much larger engine than that necessary for the open and level road. Thus, vehicles having differentials with a 1—1 to 2-1 gear ratio and equipped with this transmission will have the ability to travel 30 to 50 per cent farther than those without it one the same amount of fuel.

From a standstill, the transmission will start out at a fairly low motor to rear wheel ratio and very rapidly adjust itself to the demands placed on it. Since the gear ratio in the differential can either be eliminated or greatly reduced thru use of this transmission, it means the engine propelling the vehicle will revolve 30 to 50% less in overall travel thereby greatly increasing engine life and consuming much less fuel. The elimination of oil pumps and bands plus the overall simplicity of design makes this transmission capable of performing with a minimum of maintenance. Due to the wide range of gear ratios available automatically and due to the simplicity of design, this transmission lends itself to be used in a wide range of applicatons where rotating power is used to propel the heaviest to the lightest carriers at different speeds and under varying conditions.

What is claimed is:

1. A mechanically-driven worm drive transmission capable of responding to changed load conditions while providing low motor to drive wheel ratios, said transmission having an internal worm drive output shaft connected at one end to a mechanically gear-driven worm drive unit through a first turbine-driven planetary gear system having a carrier connected to and driven by the turbine of a torque converter and at the other end a second planetary gear system having a carrier driven by the primary pump of said torque converter and annulus gear providing a base, adjacent to said torque converter, for driving at least two associated pinion gears which in turn rotate a sun gear and separate worm driven ring gear, whereby the speed of rotation of said latter two gears exceeds that of both said driven second planet carrier and its associated engine-driven primary pump, whereby the speed of rotation of said sun gear and its connected worm drive ring gear is directly proportional to that of said first turbine-driven planet carrier and output shaft.

2. A transmission as in claim 1 wherein said torque converter means drives said second planetary gears and worm drive ring gear through a separate annulus gear and output shaft return housing operatively connected to said output shaft.

3. A transmission as in claim 1, wherein said second planetary gear system drives said worm drive ring gear which in turn drives a plurality of first planetary pinion worm gears capable of axial rotation thereby permitting controlled rotation of said associated planetary worm carrier around said sun worm gear in the same direction of travel as that of an associated motor, turbine and said primary pump.

4. The transmission as in claim 3 wherein said worm gears operate as a governor or sliding clutch between said first planetary worm carrier and said sun worm gear thereby permitting rotation of the former without necessarily rotating the latter.

5. The transmission as in claim 4 wherein rotation of said engine during acceleration effects positive rotation of said planetary pinion worm gears permitting controlled rotation of said planetary worm carrier about said sun worm gear.

* * * * *